United States Patent
Fuldseth et al.

(10) Patent No.: US 10,694,206 B2
(45) Date of Patent: *Jun. 23, 2020

(54) MOTION COMPENSATION USING A PATCHWORK MOTION FIELD

(71) Applicant: Cisco Technology, Inc., San Jose, CA (US)

(72) Inventors: Arild Fuldseth, Snaråya (NO); Gisle Bjontegaard, Oppegard (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,429

(22) Filed: Sep. 28, 2018

(65) Prior Publication Data

US 2019/0037233 A1 Jan. 31, 2019

Related U.S. Application Data

(63) Continuation of application No. 15/273,781, filed on Sep. 23, 2016, now Pat. No. 10,136,155.

(60) Provisional application No. 62/367,236, filed on Jul. 27, 2016.

(51) Int. Cl.
| | |
|---|---|
| *H04N 19/52* | (2014.01) |
| *H04N 19/105* | (2014.01) |
| *H04N 19/139* | (2014.01) |
| *H04N 19/172* | (2014.01) |
| *H04N 19/176* | (2014.01) |
| *H04N 19/577* | (2014.01) |

(52) U.S. Cl.
CPC .......... *H04N 19/52* (2014.11); *H04N 19/105* (2014.11); *H04N 19/139* (2014.11); *H04N 19/172* (2014.11); *H04N 19/176* (2014.11); *H04N 19/577* (2014.11)

(58) Field of Classification Search
CPC .... H04N 19/176; H04N 19/52; H04N 19/513; H04N 19/577; H04N 19/527; H04N 19/172
USPC ...................................... 375/240.16
See application file for complete search history.

(56) References Cited

U.S. PATENT DOCUMENTS

| | | | |
|---|---|---|---|
| 4,703,350 | A | 10/1987 | Hinman |
| 5,654,771 | A | 8/1997 | Tekalp et al. |
| 5,926,225 | A | 7/1999 | Fukuhara et al. |
| 6,163,575 | A | 12/2000 | Nieweglowski et al. |
| 6,205,177 | B1 | 3/2001 | Girod et al. |

(Continued)

FOREIGN PATENT DOCUMENTS

EP 2094017 A2 8/2009

OTHER PUBLICATIONS

Zhai, et al., "A Low Complexity Motion Compensated Frame Interpolation Method," IEEE International Symposium on Circuits and Systems (ISCAS 2005), May 2005, pp. 4927-4930.

(Continued)

*Primary Examiner* — Jared Walker
(74) *Attorney, Agent, or Firm* — Edell, Shapiro & Finnan, LLC

(57) ABSTRACT

Techniques for direct mode video coding/decoding techniques. According to one embodiment, various blocks in B frames may use motion vectors from different reference frames (P frames or B frames), according to what is referred to herein as a patchwork motion field. Different blocks of a given frame may use motion vectors inherited from different frames for purposes of computing a predicted block for the given frame.

23 Claims, 11 Drawing Sheets

(56) References Cited

U.S. PATENT DOCUMENTS

| | | | |
|---|---|---|---|
| 6,249,318 B1 | 6/2001 | Girod et al. |
| RE37,858 E | 9/2002 | Murakami et al. |
| 6,650,284 B1 | 5/2003 | Girod et al. |
| 6,809,231 B2 | 10/2004 | Wiegand et al. |
| 6,816,552 B2 | 11/2004 | Demos |
| 7,154,952 B2 | 12/2006 | Tourapis et al. |
| 7,266,150 B2 | 9/2007 | Demos |
| 7,310,373 B2 | 12/2007 | Kondo et al. |
| 7,515,635 B2 | 4/2009 | Nagai et al. |
| 7,542,510 B2 | 6/2009 | Kadono et al. |
| 7,599,437 B2 | 10/2009 | Chujoh et al. |
| 7,660,175 B2 | 2/2010 | Kohlert et al. |
| 8,009,733 B2 | 8/2011 | Hagai et al. |
| 8,139,638 B2 | 3/2012 | Demos |
| 8,144,774 B2 | 3/2012 | Demos |
| 8,160,142 B2 | 4/2012 | Demos |
| 8,208,547 B2 | 6/2012 | Haskell et al. |
| 8,213,507 B2 | 7/2012 | Demos |
| 8,218,639 B2 | 7/2012 | Bjontegaard |
| 8,290,043 B2 | 10/2012 | Demos |
| 8,325,809 B2 | 12/2012 | Demos |
| 8,363,721 B2 | 1/2013 | Tian et al. |
| 8,401,078 B2 | 3/2013 | Demos |
| 8,488,674 B2 | 7/2013 | Demos |
| 8,588,306 B2 | 11/2013 | Nair |
| 8,594,199 B2 | 11/2013 | Rossignol et al. |
| 8,711,938 B2 | 4/2014 | Van Beek |
| 8,736,767 B2 | 5/2014 | van Beek |
| 8,873,629 B2 | 10/2014 | Demos |
| 8,873,632 B2 | 10/2014 | Demos |
| 8,929,451 B2 | 1/2015 | Fishwick et al. |
| 8,953,685 B2 | 2/2015 | Dane et al. |
| 8,971,412 B2 | 3/2015 | Ye et al. |
| 9,332,270 B2 | 5/2016 | Ju |
| 2007/0019730 A1 | 1/2007 | Lee et al. |
| 2009/0148058 A1 | 7/2009 | Dane et al. |
| 2009/0232214 A1 | 9/2009 | Ghanbari |
| 2012/0008688 A1 | 1/2012 | Tsai et al. |
| 2013/0235274 A1 | 9/2013 | Nasu et al. |
| 2014/0064369 A1 | 3/2014 | Laroche et al. |
| 2018/0035127 A1 | 2/2018 | Fuldseth et al. |

OTHER PUBLICATIONS

Kamp, et al., "Decoder Side Motion Vector Derivation for Inter Frame Video Coding," IEEE International Conference on Image Processing (ICIP 2008), Oct. 2008, 4 pages.

T. Yamamoto, et al., "Alternative colPic for temporal direct prediction", Document VCEG-AB07, ITU—Telecommunications Standardization Sector, Study Group 16 Question 6, Video Coding Experts Group (VCEG), 29th Meeting: Bangkok, Jan. 16-17, 2006, 5 pages.

J. Zheng, et al., "Extended Direct Mode for Hierarchical B Picture Coding", IEEE International Conference on Image Processing, Sep. 14, 2005, Genova, Italy, 4 pages.

Invitation to Pay Additional Fees and Partial Search Report in corresponding International Application No. PCT/US2017/041941, dated Sep. 25, 2017, 16 pages.

400

```
┌─────────────────────────────────┐
│  FOR A FRAME IN A SEQUENCE OF   │
│  FRAMES OF A VIDEO SIGNAL, AND  │── 410
│  FOR EACH OF A PLURALITY OF     │
│  BLOCKS IN THE FRAME, STORING   │
│  DATA DESCRIBING A MOTION       │
│  VECTOR THAT IS DERIVED FROM    │
│  COLLOCATED BLOCKS OF A         │
│  PLURALITY OF PREVIOUSLY        │
│  DECODED FRAMES THAT ARE        │
│  AVAILABLE FOR FORMING A        │
│  PREDICTED BLOCK FOR EACH OF    │
│  THE PLURALITY OF BLOCKS OF THE │
│  FRAME, EACH MOTION VECTOR      │
│  HAVING AN X-COMPONENT AND A    │
│  Y-COMPONENT                    │
└─────────────────────────────────┘
                 │
                 ▼
┌─────────────────────────────────┐
│  FOR A GIVEN BLOCK OF THE       │
│  PLURALITY OF BLOCKS, MODIFYING │── 420
│  THE MOTION VECTOR OF THE GIVEN │
│  BLOCK BY FILTERING THE MOTION  │
│  VECTOR FOR THE GIVEN BLOCK     │
│  BASED ON AN X-COMPONENT AND A  │
│  Y-COMPONENT OF THE MOTION      │
│  VECTOR OF THE GIVEN BLOCK AND  │
│  X-COMPONENTS AND Y-COMPONENTS  │
│  OF MOTION VECTORS FOR TWO OR   │
│  MORE NEIGHBORING BLOCKS TO THE │
│  GIVEN BLOCK TO PRODUCE A       │
│  MODIFIED MOTION VECTOR FOR THE │
│  GIVEN BLOCK                    │
└─────────────────────────────────┘
```

FIG.5

MOTION COMPENSATION USING A PATCHWORK MOTION FIELD

PRIORITY CLAIM

This application is a continuation of U.S. application Ser. No. 15/273,781, filed Sep. 23, 2018, which in turn claims priority to U.S. Provisional Application No. 62/367,236, filed Jul. 27, 2016. The entirety of each of these applications is incorporated herein by reference.

TECHNICAL FIELD

The present disclosure relates to video codec technologies.

BACKGROUND

In block-based video compression, motion-compensated prediction is typically performed as follows. A motion vector is transmitted that represents a displacement between a block in the current frame and a corresponding block in a previously decoded and reconstructed reference frame. A predicted block is generated for the current block based on the displaced block in the reference frame. A residual block is decoded based on transmitted residual information. A reconstructed block is generated by adding the residual block to the predicted block. In the case of bi-prediction, two motion vectors and two corresponding reference blocks are combined to generate the predicted block through sample-by-sample averaging or alternatively, using weight factors that are different from 0.5.

At the decoder side, motion vectors can be determined in multiple ways. One way involves transmission of a motion vector difference relative to a motion vector predictor that is known both in the encoder and in the decoder. Another way involves transmission of an index that selects between a set of candidate vectors, typically from neighbor blocks in the same picture or from a collocated block in a previously transmitted picture (e.g. skip mode in H.264 and use of the merge candidate list in H.265). Still another way is direct mode in H.264 B frames (or temporal merge candidates in H.265), in which the motion vectors used for bi-prediction are derived from a collocated block in a previously transmitted picture. Which method to use for a particular block is typically chosen by the encoder and signaled to the decoder as side information.

BRIEF DESCRIPTION OF THE DRAWINGS

FIG. 5 is a flow chart of operations performed for the filtering process depicted in FIG. 6, according to an example embodiment.

DESCRIPTION OF EXAMPLE EMBODIMENTS

Overview

Figure 1:
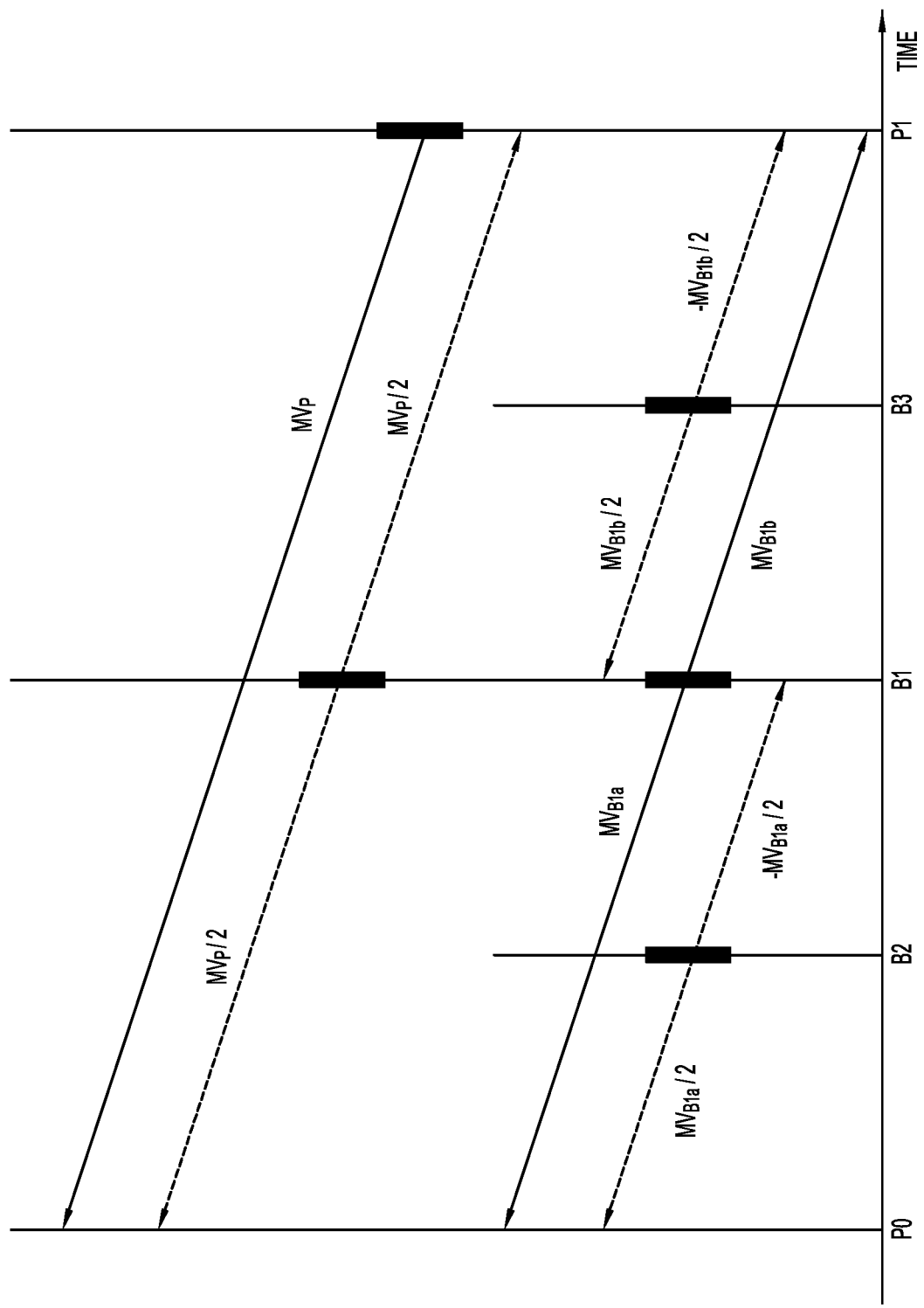
FIG. 1 is a diagram illustrating a hierarchical B frame scenario using direct mode for two B frames, according to an example embodiment.

Presented herein are techniques for direct mode video coding/decoding. Various blocks in B frames may perform bi-prediction using collocated motion vectors from different reference frames (P frames or B frames), according to what is referred to herein as a patchwork motion field.

In one embodiment, a method is provided in which, for a first frame in a sequence of frames of a video signal, for a first block of the first frame, a determination is made of a collocated block in a second frame of the sequence of frames that has an explicitly transmitted motion vector pointing to a previously decoded frame of the sequence of frames that is different from the first frame and the second frame. A predicted block is computed for the first block of the first frame using the motion vector of the collocated block of the second frame. For a second block of the first frame, a collocated block is determined in a third frame of the sequence of frames that has an explicitly transmitted motion vector pointing to a previously decoded frame of the sequence of frames that is different from the first frame and the third frame. A predicted block is computed for the second block of the first frame using the motion vector of the collocated block of the third frame.

Example Embodiments

Direct Mode

Direct mode in H.264 is defined for a large variety of frame reordering schemes. Below is a description of how direct mode works for two common reordering schemes, one B frame, and hierarchical B frames with 3 consecutive B frames.

One B Frame

Consider the following frame ordering scheme:

| I | B | P | B | P | B | P |
|---|---|---|---|---|---|---|
| 0 | 2 | 1 | 4 | 3 | 6 | 5 |

The frames are listed in display order, while the numbers indicate the decoding order. A block in a P frame is typically predicted from previous P frames, while blocks in a B frame can be predicted from either the previous P frame (forward uni-prediction) or the next P frame (backward uni-prediction) or both P frames (bi-directional bi-prediction). When decoding a block in a B frame (a B-block), the motion vector, $MV_P$, for the next P frame (in display order) is already available in the decoder.

For the B frame, if direct mode is chosen for a particular block, a new vector is derived by dividing the already transmitted vector, $MV_P$, by 2 (i.e. dividing both the x- and y-component of the motion vector by 2). Furthermore, to apply bi-prediction a second vector with the opposite sign is also derived. The two vectors are pointing to the next P-frame and the previous P frame respectively.

Finally, a predicted block p(x,y) is calculated as follows:

$$p(x,y)=[P0(x+MV_P(x)/2,y+MV_P(y)/2)+P1(x-MV_P(x)/2,y-MV_P(y)/2)]/2$$

where $MV_P(x)$ and $MV_P(y)$ are the x and y components of motion vector $MV_P$, respectively. Note also that direct mode is not necessarily restricted to the case where the temporal location of the B frame is half-way between the two P frames. In the general case, the temporal distances are unequal and the my scaling factor would not necessarily be equal to 0.5.

Direct mode has several advantages:

1. No bits are used on sending explicit or implicit motion vector information.

2. Temporal artifacts are reduced by generating a smooth linear transition between the two P frames. The subjective gain of this might be higher than the objective (PSNR-based) gain.

3. In many cases the predicted block is so close to the original that no residual information is needed. This allows for generation of B-blocks using almost no bits.

4. In many cases, the motion vector field of the P frames will have a smaller granularity (e.g. 8×8 or 4×4 samples) than the B-block (e.g. 64×64 samples). This allows for multiple motion vectors and highly granular motion field inside a larger B-block with no additional bit cost.

Hierarchical B Frames

Consider the following hierarchical frame reordering scheme:

| P0 | B2 | B1 | B3 | P1 |
|---|---|---|---|---|
| 0 | 3 | 2 | 4 | 1 | where the transmission/decoding order is P0, P1, B1, B2, B3. In that case, H.264 direct mode would typically work for direct mode blocks in B1, B2 and B3 as shown in FIG. 1.

Unavailable Motion Vectors

Some important special cases occur when $MV_{B1a}$ or $MV_{B1b}$ shown in FIG. 1 are not transmitted in the bit-stream, but their values are needed if a block in B2 or B3 is coded in direct mode. There are at least three cases of importance. These cases are listed below with the associated substitute definition of $MV_{B1a}$ and $MV_{B1b}$ that are typically used for direct mode.

1. The collocated block in B1 is coded in direct mode:
$MV_{B1a}=MV_P/2$
$MV_{B1b}=-MV_P/2$ 2. The collocated block in B1 is an intra block:
$MV_{B1a}=0$
$MV_{B1b}=0$ 3. The collocated block in B1 is coded in uni-prediction mode, i.e. either $MV_{B1a}$ or $MV_{B1b}$ are not present in the bit-stream:
$MV_{B1a}=-MV_{B1b}$ or
$MV_{B1b}=-MV_{B1a}$ Instead of using substitute definitions of $MV_{B1a}$ and $MV_{B1b}$ as described above it is preferable to us motion vectors of a collocated block in a different frame as described below.

Patchwork Motion Field

Figure 2A:
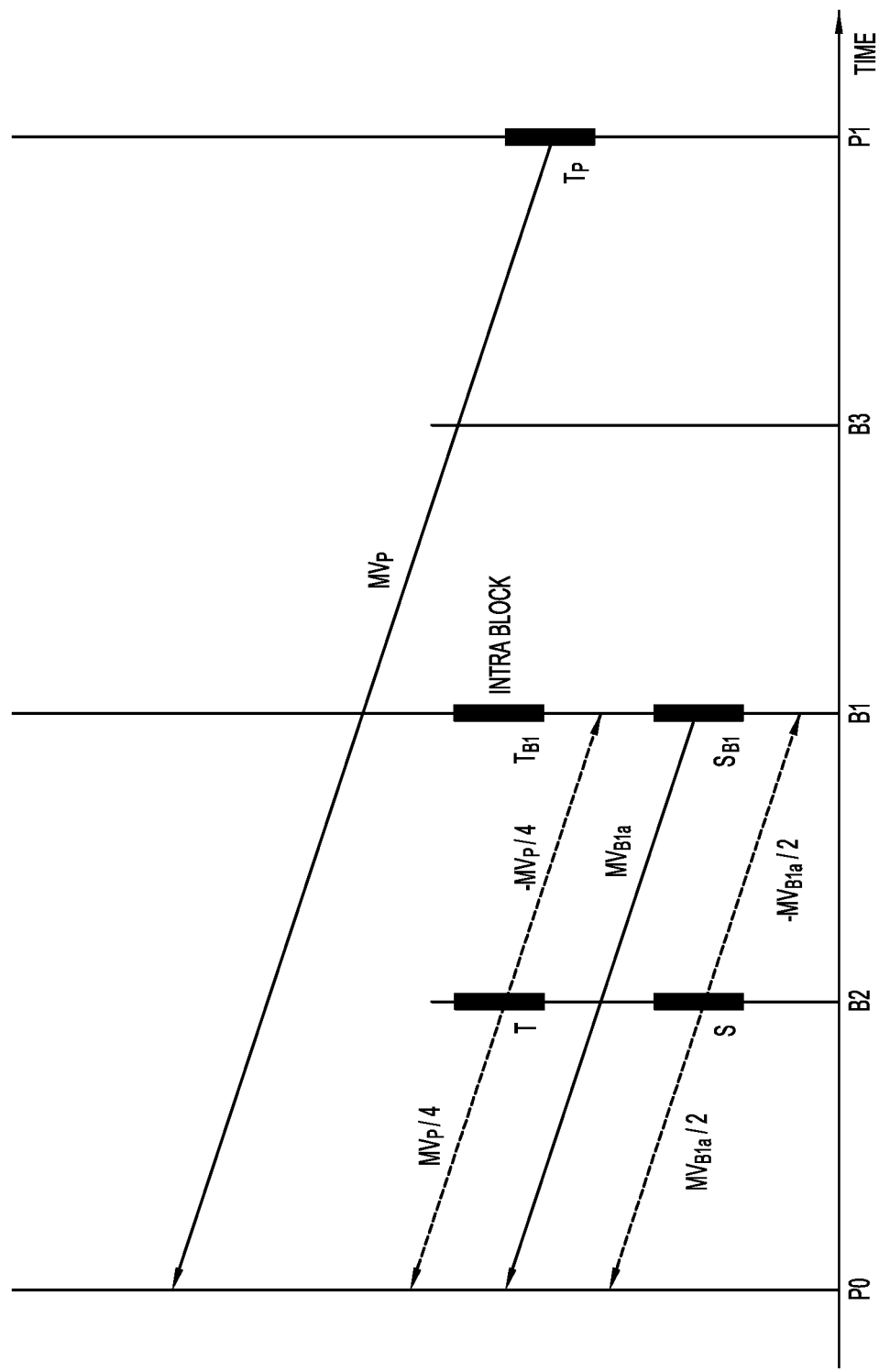
FIG. 2A is a diagram, similar to FIG. 1, and illustrating a hierarchical B frame scenario employing a patchwork motion field, according to an example embodiment.
Figure 2B:
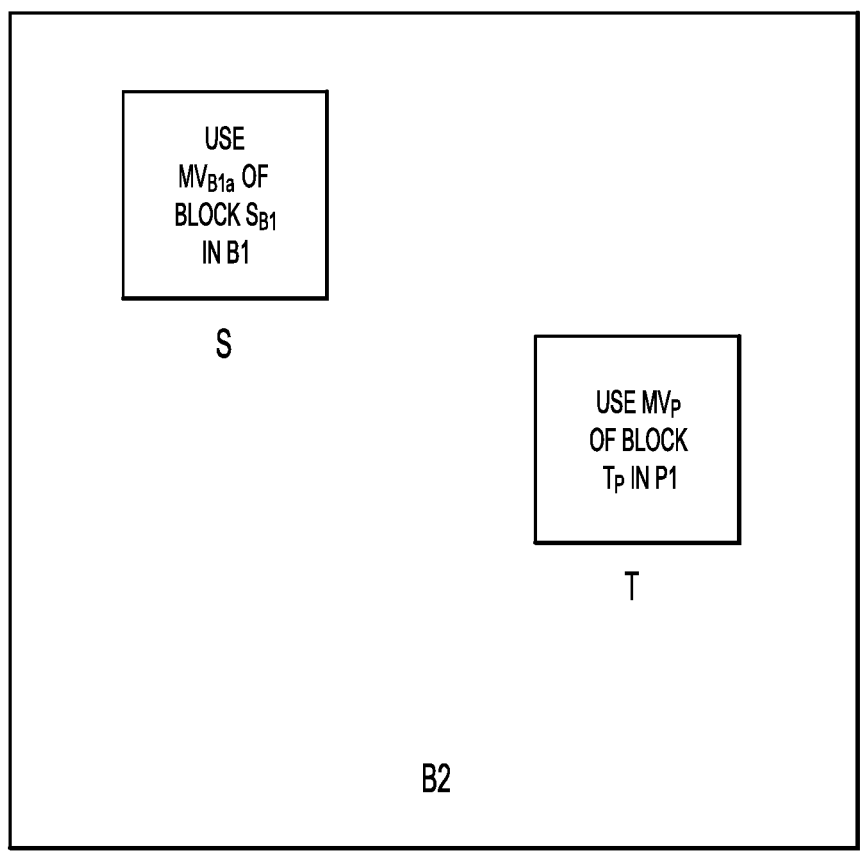
FIG. 2B is a diagram illustrating how two blocks from the same frame use motion vectors from different frames in accordance with the example of FIG. 2A.

In accordance with one embodiment, if the motion vector $MV_{B1a}$ (or $MV_{B1b}$) (shown in FIG. 1) are not explicitly transmitted in the bit-stream, the vectors used in direct mode for the corresponding block in B2, (B3) are defined as $MV_P/4$ and $-MV_P/4$ respectively. An example is illustrated in FIGS. 2A and 2B, where a block S in frame B2, has a collocated block $S_{B1}$ in frame B1 which a motion vector $MV_{B1a}$ resulting in the motion vectors $MV_{B1a}/2$ and $-MV_{B1a}/2$ for direct mode coding of S. On the other hand, the block T in frame B2, has a collocated block $T_{B1}$ in frame B1, but $T_{B1}$ is an intra block and has no motion vector. Consequently, according to the example embodiment, the collocated block $T_P$ in frame P1 is used instead with motion vectors $MV_P/4$ and $-MV_P/4$ for direct mode coding of T. This implies that the corresponding block in B2 (S and T in the example) will use motion vectors from different reference frames (P1 and B1 in the example), hence the term patchwork motion field given to this embodiment. The patchwork motion field method can be applied to any hierarchical (or non-hierarchical) frame reordering scheme where the collocated block in one frame can be replaced with a collocated block in another frame if the collocated block in the first frame does not have an explicitly transmitted motion vector. The patchwork motion field method operates typically as follows. In a block for a given frame, it is determined whether, in a closest frame, the collocated block in that frame has a motion vector. If the collocated block in that closest frame has a motion vector, it is used. If the collocated block in that frame does not have a motion vector, then a search is made to another frame to determine if there is a motion vector for the collocated block in that other frame. If the collocated block in that other frame has a motion vector, it is used.

Figure 3:
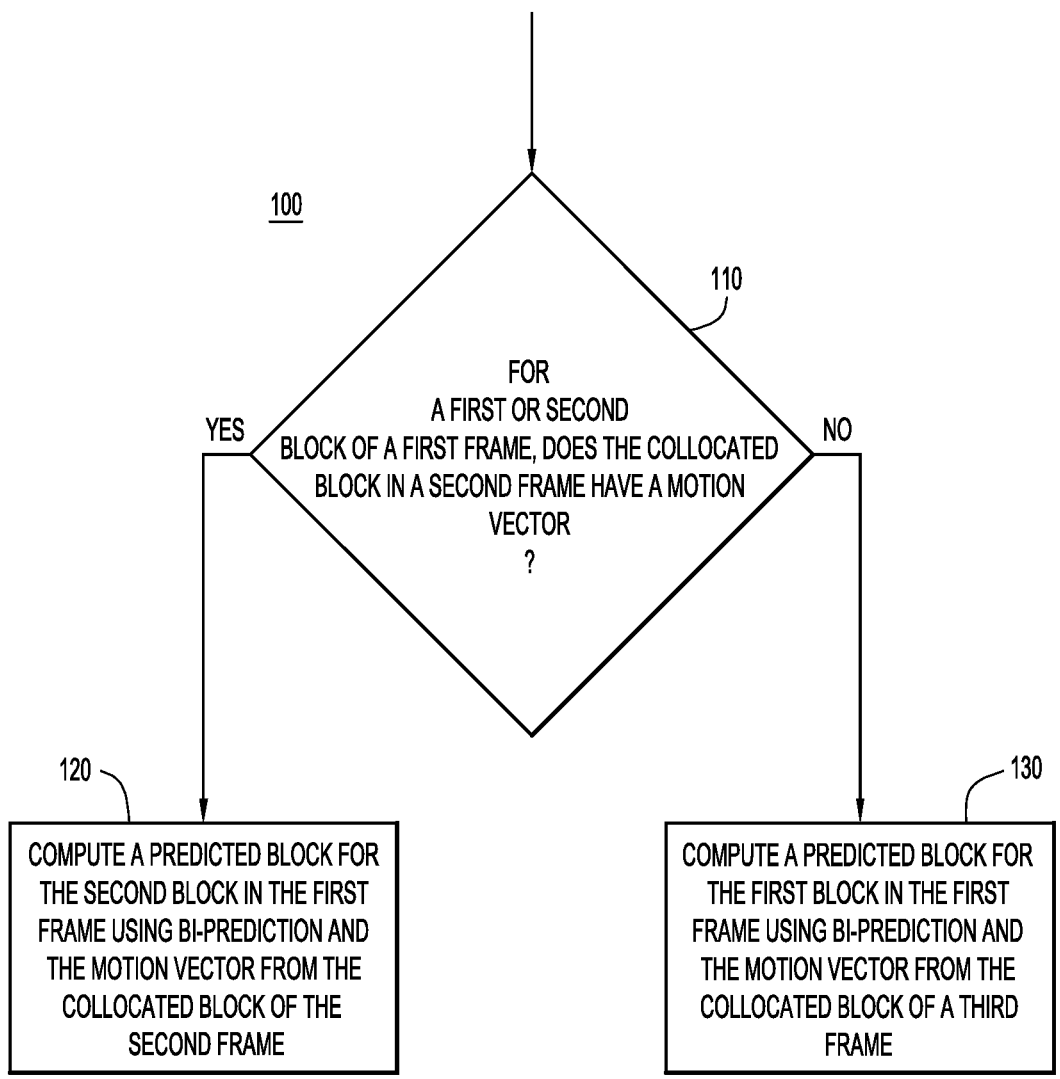
FIG. 3 is a flow chart depicting operations performed in an encoder or decoder in accordance with the patchwork motion field depicted in FIGS. 2A and 2B, according to an example embodiment.

Referring now to FIG. 3, a flow chart for patchwork motion field method 100 is now described, according to an embodiment. At 110, for a first or a second block of a first frame in a sequence of frames of a video signal, it is determined whether the collocated block of a second frame of the sequence of frames has an explicitly transmitted motion vector (pointing to a previously decoded frame of the sequence of frames that is different from the first frame and the second frame). If the determination at 110 is positive, then at 120, a predicted block for the first block of the first frame is computed using bi-prediction and the motion vector of the collocated block of the second frame. If the determination at 110 is negative, at 130, for the second block of the first frame, a predicted block for the second block of the first frame is computed using bi-prediction and the motion vector of the collocated block of a third frame in the sequence of frames (different from the first frame and second frame). Examples are provided above for computations that may be used in steps 120 and 140 for computing the predicted block.

Thus, in accordance with the method of 100, different blocks of the same frame use, for computing a predicted block, a motion vector of a collocated block in a different reference frame. Generically speaking, for a first block in a first frame of a sequence of frames, a collocated block is determined in a second frame of the sequence of frames, the collocated block in the second frame having a motion vector pointing to a previously decoded frame of the sequence of frames that is different from the first frame and the second frame. A predicted block for the first block in the first frame is computed using the motion vector of the collocated block in the second frame. Similarly, for a second block in the first frame, a collocated block is determined in a third frame of the sequence of frames, the collocated block in third frame having a motion vector pointing to a previously decoded frame of the sequence of frames that is different from the first frame and the third frame. A predicted block is computed for the second block in the first frame using the motion vector of the collocated block in the third frame. As explained above in connection with FIG. 3, the computation of the predicted block (e.g., at steps 120 and 130) may be a bi-prediction computation.

The method 100 may further include, when the second frame is closer temporally to the first frame than the third frame is to the first frame, determining, for the second block of the first frame, that a collocated block in the second frame does not have an explicitly transmitted motion vector. In this case, operation 130 of determining for the second block of the first frame the collocated block that has a motion vector in the third frame, is performed when it is determined, for the second block of the first frame, that the collocated block in the second frame does not have an explicitly transmitted motion vector. In other words, the motion vector search starts with the collocated block in the temporally closest frame.

As explained above in connection with FIG. 2A, the first frame, second frame and third frame may be part of a hierarchical frame reordering scheme. For example, the second frame may be prior to the first frame in display order, and the third frame is after the first frame in display order. In another possibility, the second frame and the third frame are prior to the first frame, in display order. Still another possibility is that the second frame and the third frame are after the first frame, in display order.

Filtering of the Motion Field

Figure 4:
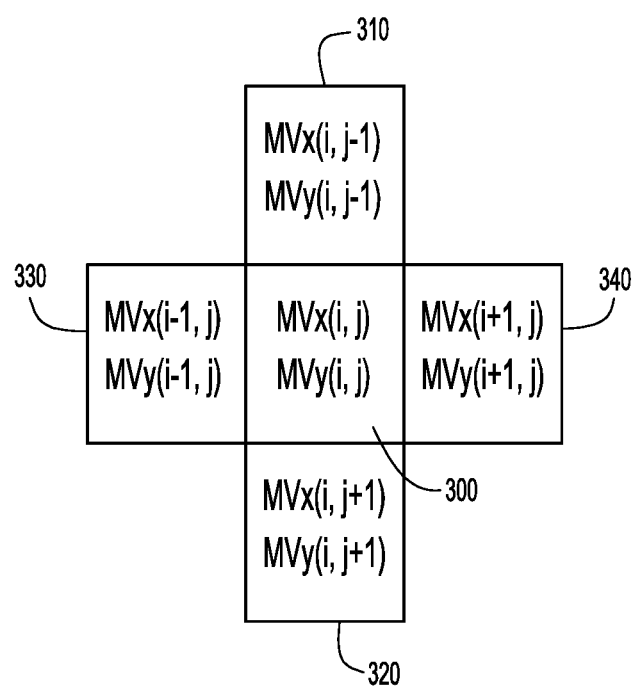
FIG. 4 depicts motion vectors of a current block and of neighbor blocks used as input to a filtering process for the motion vectors of a current block, according to an example embodiment.

Assume that prior to encoding the current B frame, the vectors that are available for use with direct mode are stored as a motion field for the entire frame. Typically, motion field vectors are stored with the granularity of the smallest motion block size (for example, 4×4 or 8×8 samples). Due to noise and imperfect encoder decisions, this motion field might not represent the true motion between the frames and might be less smooth than desired. Also, the encoder may select motion vectors that do not create a homogenous motion vector field. The encoder causes this, but both the encoder and decoder may remedy it. Specifically, to compensate for the imperfect encoder decisions, a filter may be applied to the motion field from previous frames prior to coding the current frame. An example of a filtering process is given below and shown in FIG. 6 where each square corresponds to a motion block having both an x- and a y-motion vector component, MVx and MVy.

$$MV_x'(i,j)=a*MV_x(i,j-1)+b*MV_x(i-1,j)+c*MV_x(i,j)+d*MV_x(i+1,j)+e*MV_x(i,j+1)$$

$$MV_y'(i,j)=a*MV_y(i,j-1)+b*MV_y(i-1,j)+c*MV_y(i,j)+d*MV_y(i+1,j)+e*MV_y(i,j+1)$$

where (i,j) are the motion block coordinates, MVx and MVy are the unfiltered motion vector components, and MVx' and MVy' are the filtered motion vector components. Coefficients a, b, c, d and e are typically numbers less than 1. Thus, the filtered motion vector components MVx'(i,j) and MVy' (i,j) are for block (i,j) shown at reference numeral 300, generated based on the motion vector components of two or more neighboring blocks. FIG. 4 shows an example in which for a given block (i,j), upper, lower, left and right neighboring blocks 310, 320, 330 and 340 are used, but this is only an example, and more or fewer neighboring blocks may be used. FIG. 4 also shows one example where the filtering is based on motion vectors for four neighboring blocks: upper neighbor block, lower neighbor block, left neighbor block and right neighbor block.

The filtering computation used is not limited to a 1-dimensional separable filter as described above, and may include both non-linear (e.g. median) and 2-dimensional (e.g. dependency between x and y components) filters.

With reference to FIG. 5, a flow chart is shown for a motion field filtering method 400. At 410, for a frame in a sequence of frames of a video signal, and for each of a plurality of blocks in the frame, data is stored describing a motion vector that is derived from collocated blocks of a plurality of previously decoded frames that are available for forming a predicted block for each of the plurality of blocks of the frame, each motion vector having an x-component and a y-component. At 420, for a given block of the plurality of blocks, the motion vector of the given block is modified by filtering the motion vector for the given block based on an x-component and a y-component of the motion vector of the given block and x-components and y-components of motion vectors for two or more neighboring blocks to the given block to produce a modified motion vector for the given block.

The filtering of operation 420 may involve generating the x-component of the modified motion vector of the given block based on a linear combination of the x-component of the motion vector of the given block and the x-components of the motion vectors of the two or more neighboring blocks, and generating the y-component of the modified motion vector of the given block based on a linear combination of the y-component of the motion vector of the given block and the y-components of the motion vectors of the two or more neighboring blocks. For example, the filtering may involve generating the x-component of the modified motion vector of the given block based on a respective one of a plurality of first coefficients applied to the x-component of the motion vector of the given block and to the x-component of the motion vectors of the neighboring blocks to the given block, and generating the y-component of the modified motion vector of the given block based on a respective one of a plurality of second coefficients applied to the y-component of the motion vector of the given block and to the y-component of the motion vectors of the neighboring blocks to the given block. In other words, the equation above is generalized such that, $$MVx(i, j) = \sum_{m,n} a(m, n)MVx(i-m, j-n)$$

$$MVy(i, j) = \sum_{m,n} a(m, n)MVy(i-m, j-n)$$

Also, the filtering may involve generating the motion vector for the given block using a 2-dimensional computation having dependency between x-components and y-components.

The storing operation 410 and filtering operation 420 may be performed at an encoder, or at a decoder, but typically will be performed at both the encoder and decoder.

Thus, in summary, a method is provided including: for a frame in a sequence of frames of a video signal, and for each of a plurality of blocks in the frame, storing data describing a motion vector that is derived from collocated blocks of a plurality of previously decoded frames that are available for forming a predicted block for each of the plurality of blocks of the frame, each motion vector having an x-component and a y-component; and for a given block of the plurality of blocks, modifying the motion vector of the given block by filtering the motion vector for the given block based on an x-component and a y-component of the motion vector of the given block and x-components and y-components of motion vectors for two or more neighboring blocks to the given block to produce a modified motion vector for the given block.

In one form, the filtering includes generating the x-component of the modified motion vector of the given block based on a linear combination of the x-component of the motion vector of the given block and the x-components of the motion vectors of the two or more neighboring blocks, and generating the y-component of the modified motion vector of the given block based on a linear combination of the y-component of the motion vector of the given block and the y-components of the motion vectors of the two or more neighboring blocks.

In another form, the filtering includes generating the x-component of the modified motion vector of the given block based on a respective one of a plurality of first coefficients applied to the x-component of the motion vector of the given block and to the x-component of the motion vectors of the neighboring blocks to the given block, and generating the y-component of the modified motion vector of the given block based on a respective one of a plurality of second coefficients applied to the y-component of the motion vector of the given block and to the y-component of the motion vectors of the neighboring blocks to the given block.

It is to be appreciated that the motion field filtering techniques may be used together with the patchwork motion field concepts described herein. Thus, generally, for each of a plurality of blocks in a first frame, data is stored describing a motion vector that is derived from collocated blocks of a plurality of previously decoded frames that are available for forming a predicted block for each of the plurality of blocks of the first frame, each motion vector having an x-component and a y-component. For a given block of the plurality of blocks, the motion vector of the given block is modified by filtering the motion vector for the given block based on an x-component and a y-component of the motion vector of the given block and x-components and y-components of motion vectors for two or more neighboring blocks to the given block to produce a modified motion vector for the given block.

Offset Vector

As described above, the prediction block, p(x,y) in direct mode is typically computed as follows:

$$p(x,y)=[P0(x+MVx/2,y+MVy/2)+P1(x-MVx/2,y-MVy/2)]/2$$

Since motion might not be constant between two frames, it may be beneficial to apply an offset vector O (composed of offset x- and offset-y components (Ox,Oy)) to motion vectors as follows:

$$p(x,y)=[P0(x+MVx/2+Ox,y+MVy/2+Oy)+P1(x-MVx/2+Ox,y-MVy/2+Oy)]/2$$

Figure 6:
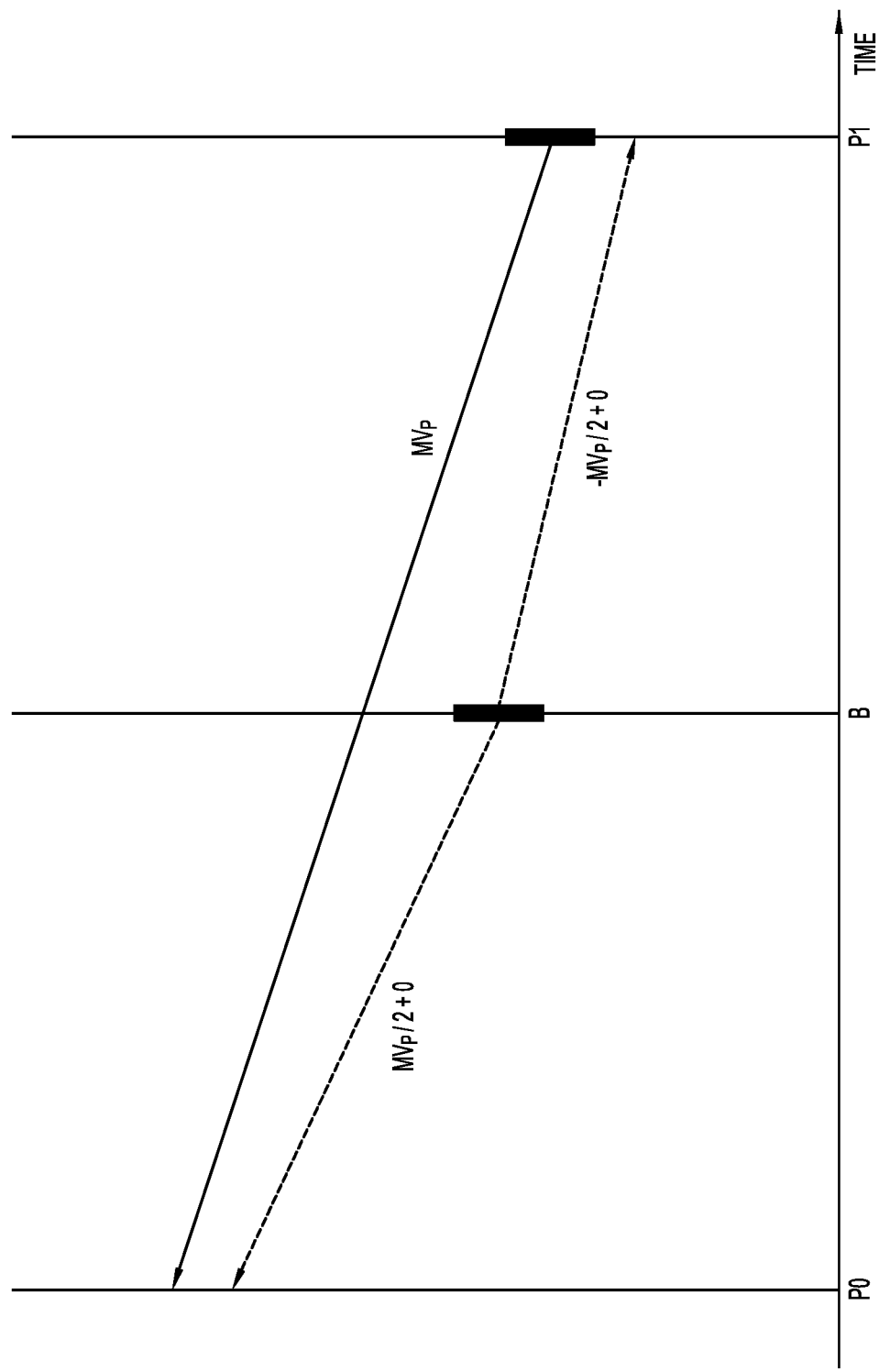
FIG. 6 is a diagram depicting use of an offset vector for modifying a motion vector, according to an example embodiment.

This is graphically depicted in FIG. 6.

The offset vector (Ox, Oy) can have integer or fractional pixel resolution and may be signaled on the frame, sub-frame, or block level, and different offset values may be used for P0 and P1. The encoder signals values for Ox and Oy to the decoder, and the decoder runs the equation with those values.

In the case of direct mode, which involves two reference frames (e.g., P0 and P1), there can be one offset vector applied to the motion vectors from both reference frames (for forward prediction and backward prediction) or two different offset vectors per block, a first offset vector used for forward prediction and a second offset vector used for backward prediction:

$$p(x,y)=[P0(x+MVx/2+O1x,y+MVy/2+O1y)+P1(x-MVx/2+O2x,y-MVy/2+O2y)]/2.$$

That is, in one form, the predicted block for the first block in the first frame is computed based on the motion vector of the collocated block in the second frame and an offset vector for forward prediction and for backward prediction. Similarly, the predicted block for the second block in the first frame is computed based on the motion vector of the collocated block in the third frame and an offset vector for forward prediction and for backward prediction. In another form, the predicted block for the first block in the first frame is computed based on the motion vector of the collocated block in the second frame and a first offset vector for forward prediction and a second offset vector for backward prediction. Similarly, the predicted block for the second block in the first frame is computed based on the motion vector of the collocated block in the third frame and a first offset vector for forward prediction and a second offset vector for backward prediction.

The encoder may perform a search to generate values for the offset vector. This search could take the form of a brute force check of a range of values of Ox and Oy, calculating an error for each value, and selecting the values of Ox and Oy that minimizes an error, e.g., mean squared error. In another form, the encoder may, at a frame level, derive a global motion quantity. Further still, the offset vector may be obtained from a video camera.

Figure 7:
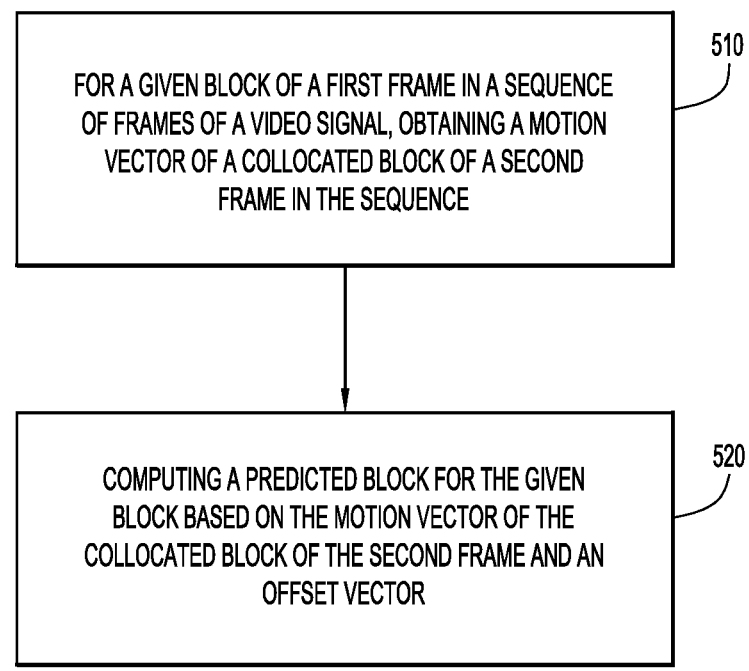
FIG. 7 is a flow chart of operations performed for use of an offset vector, according to an example embodiment.

FIG. 7 illustrates a flow chart for a method 500 for applying an offset vector to a motion vector. At 510, for a given block of a first frame in a sequence of frames of a video signal, a motion vector is obtained of a collocated block of a second frame in the sequence. At 520, a predicted block is computed for the given block based on the motion vector of the collocated block of the second frame and an offset vector. The offset vector may be generated at an encoder, and the encoder may send the offset vector to a decoder, for a block, a group of blocks or for an entire frame.

As explained above, the offset vector has an offset x-component and an offset y-component. The method 500 may further include generating the offset x-component and the offset y-component at an encoder, and sending the offset x-component and the offset y-component to a decoder for use in generating a predicted block for the given block at the decoder. Thus, the obtaining step 510 and the computing step 520 may be performed at a decoder using the offset x-component and the offset y-component received from the encoder.

The offset x-component and the offset y-component of the offset vector may be used for computing the predicted block by using a plurality of values for the offset vector and selecting one of the plurality of values for the offset vector that minimizes an error.

The predicted block for the given block in the first frame may be computed using the offset vector for forward prediction and for backward prediction. Alternatively, the predicted block for the given block in the first frame may be computed using a first offset vector for forward prediction and a second offset vector for backward prediction.

Figure 8:
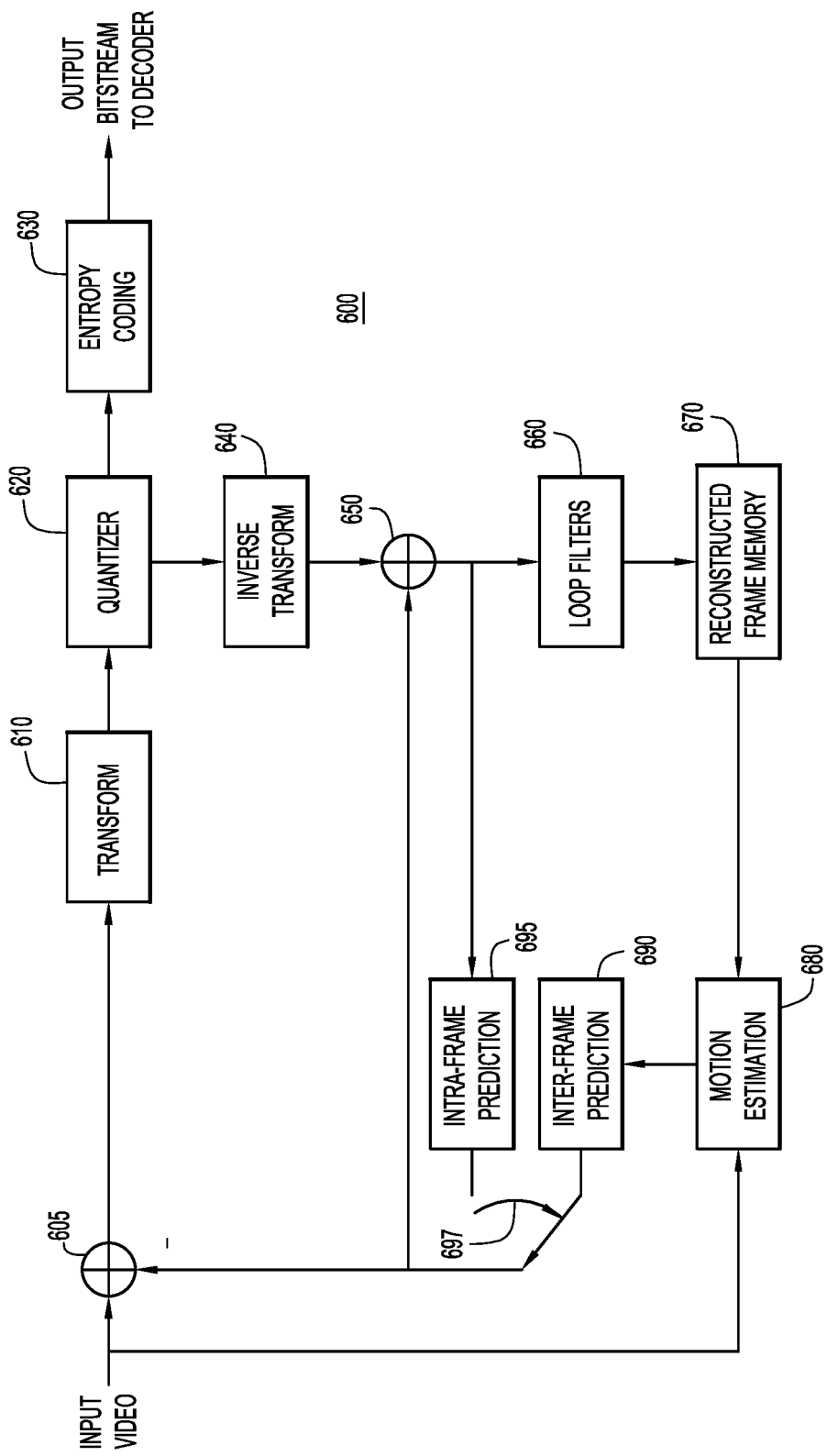
FIG. 8 illustrates a block diagram of an encoder, according to an example embodiment.

Referring to FIG. 8 a block diagram of a video encoder is shown at reference numeral 100. The video encoder 600 is configured to perform the prediction techniques presented herein. The video encoder 600 includes a subtractor 605, a transform unit 610, a quantizer unit 620, an entropy coding unit 630, an inverse transform unit 640, an adder 650, one or more loop filters 660, a reconstructed frame memory 670, a motion estimation unit 180, an inter-frame prediction unit 690, an intra-frame prediction unit 695 and a switch 697.

A current frame (input video) as well as a prediction frame are input to a subtractor 605. The subtractor 605 is provided with input from either the inter-frame prediction unit 690 or intra-frame prediction unit 695, the selection of which is controlled by switch 697. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 680 supplies a motion estimation output as input to the inter-frame prediction unit 690. The motion estimation unit 680 receives as input the input video and an output of the reconstructed frame memory 670.

The subtractor 605 subtracts the output of the switch 697 from the pixels of the current frame, prior to being subjected to a two dimensional transform process by the transform unit 610 to produce transform coefficients. The transform coefficients are then subjected to quantization by quantizer unit 620 and then supplied to entropy coding unit 630. Entropy coding unit 630 applies entropy encoding in order to remove redundancies without losing information, and is referred to as a lossless encoding process. Subsequently, the encoded data is arranged in network packets via a packetizer (not shown), prior to be transmitted in an output bit stream.

The output of the quantizer unit 620 is also applied to the inverse transform unit 640 and used for assisting in prediction processing. The adder 650 adds the output of the inverse transform unit 640 and an output of the switch 697 (either the output of the inter-frame prediction unit 690 or the intra-frame prediction unit 695). The output of the adder 650 is supplied to the input of the intra-frame prediction unit 695 and to one or more loop filters 660 which suppress some of the sharpness in the edges to improve clarity and better support prediction processing. The output of the loop filters 660 is applied to a reconstructed frame memory 670 that holds the processed image pixel data in memory for use in subsequent motion processing by motion estimation block 680.

Figure 9:
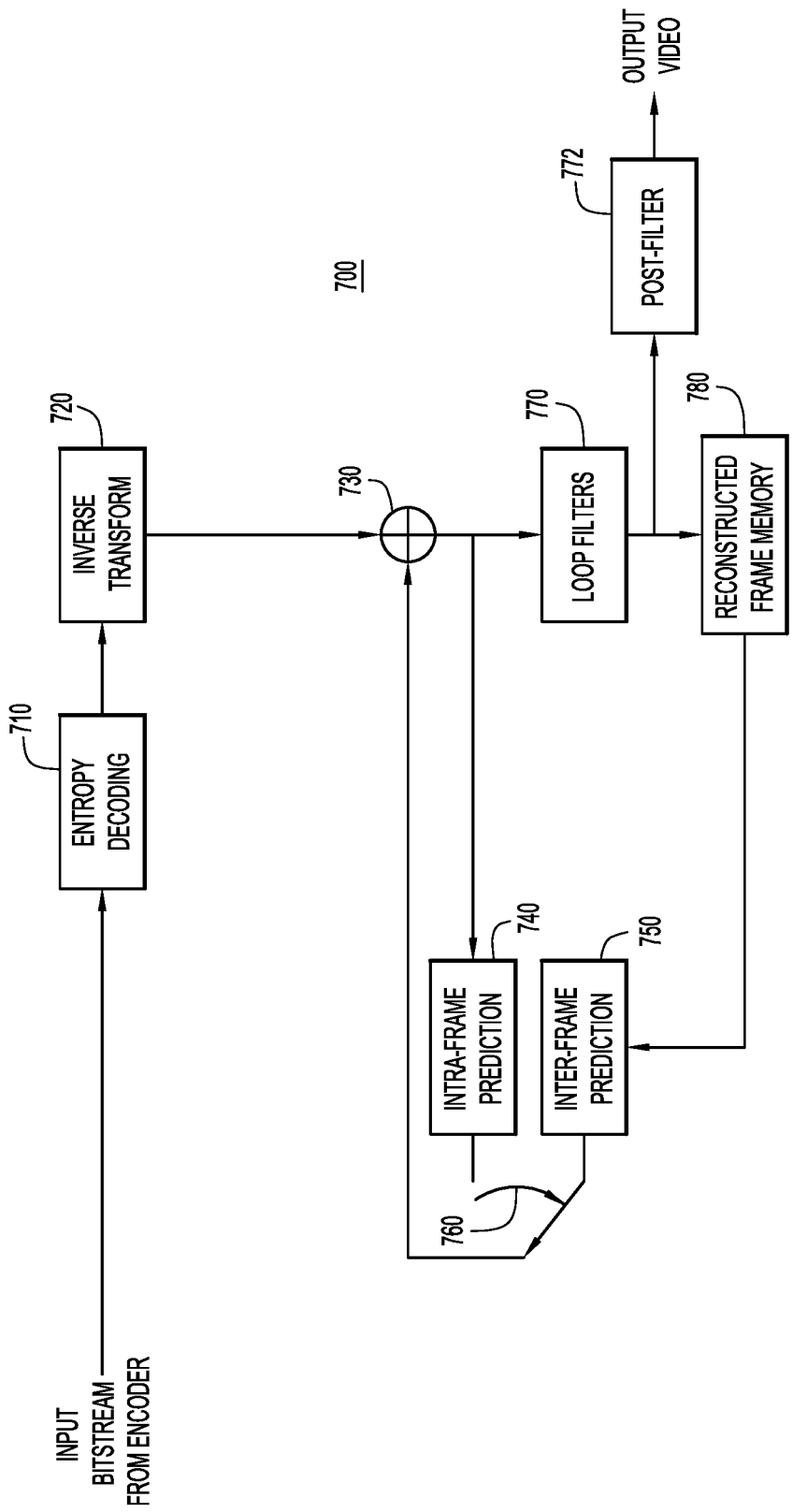
FIG. 9 illustrates a block diagram of a decoder, according to an example embodiment.

Turning to FIG. 9, a block diagram of a video decoder is shown at reference numeral 700. The video decoder 700 includes an entropy decoding unit 710, an inverse transform unit 720, an adder 730, an intra-frame prediction unit 740, an inter-frame prediction unit 750, a switch 760, one or more loop filters 770 and a reconstructed frame memory 780. In addition, a post-filter 772 is shown in FIG. 9. The entropy decoding unit 710 performs entropy decoding on the received input bitstream to produce quantized transform coefficients which are applied to the inverse transform unit 720. The inverse transform unit 720 applies two-dimensional inverse transformation on the quantized transform coefficients to output a quantized version of the difference samples. The output of the inverse transform unit 720 is applied to the adder 730. The adder 730 adds to the output of the inverse transform unit 720 an output of either the intra-frame prediction unit 740 or inter-frame prediction unit 750. The loop filters 770 operate similar to that of the loop filters 760 in the video encoder 600 of FIG. 10. An output video image is taken at the output of the loop filters 770.

The video encoder 600 of FIG. 8 and the video decoder 700 of FIG. 9 may be implemented by digital logic gates in an integrated circuit (e.g., by an application specific integrated circuit) or by two or more separate logic devices. Alternatively, the video encoder 600 and video decoder 700 may be implemented by software executed by one or more processors, as described further in connection with FIG. 10, below.

Each of the functional blocks in FIGS. 8 and 9 are executed for each coding block, prediction block, or transform block.

The motion field operations described above in connection with FIGS. 2A, 2B and 3-7 may be performed by the motion estimation block 680 and the inter-frame prediction block 690 in the encoder 900 and by the inter-frame prediction block 750 in the decoder 700.

Figure 10:
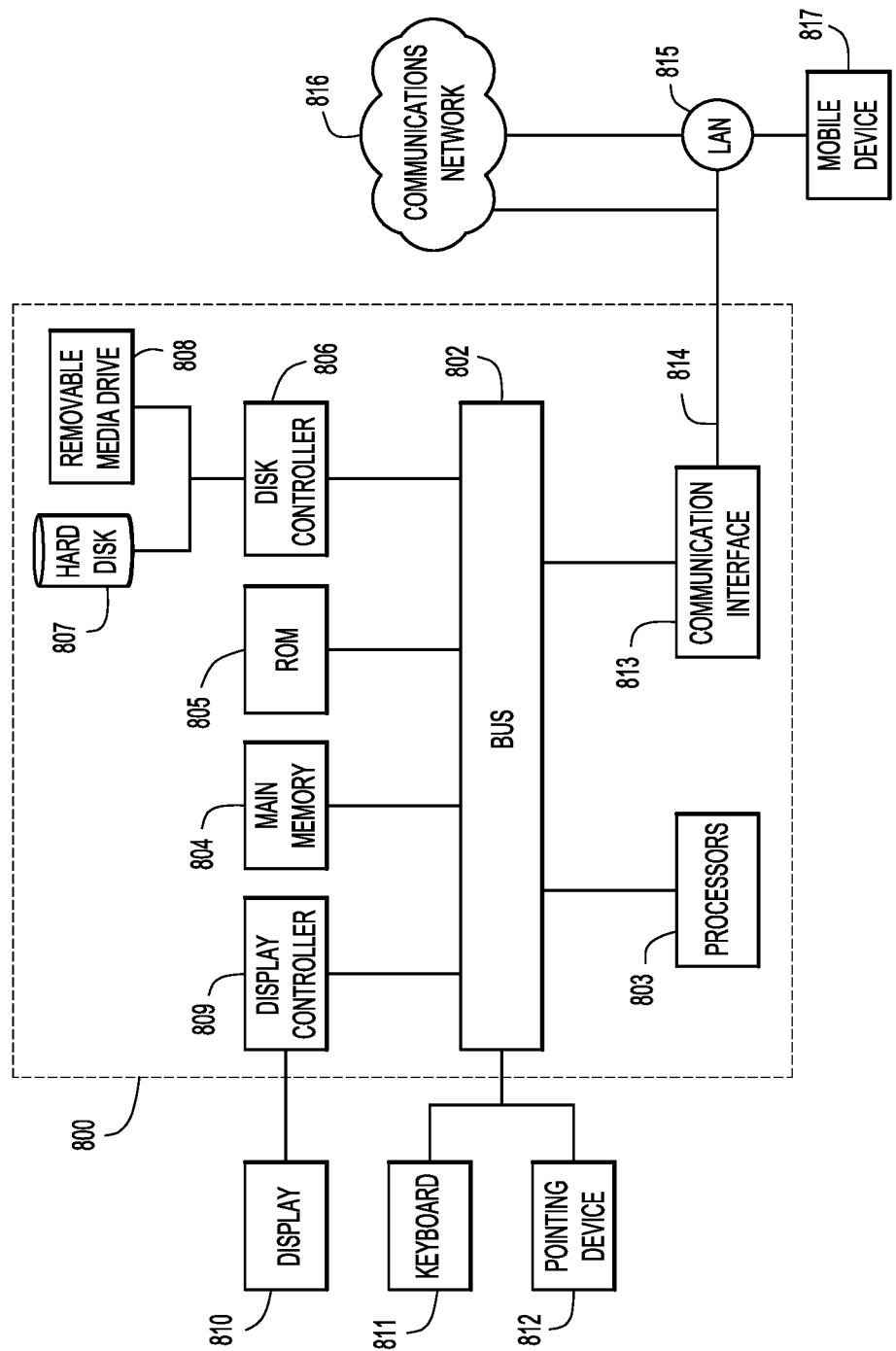
FIG. 10 illustrates a block diagram of a computing device that may be configured to perform the techniques presented herein, according to an example embodiment.

FIG. 10 illustrates a computer system 800 upon which an embodiment may be implemented. The computer system 800 may be programmed to implement a computer based device, such as a video conferencing endpoint or any device includes a video encoder or decoder for processing real time video images. The computer system 800 includes a bus 802 or other communication mechanism for communicating information, and a processor 803 coupled with the bus 802 for processing the information. While the figure shows a signal block 803 for a processor, it should be understood that the processors 803 represent a plurality of processing cores, each of which can perform separate processing. The computer system 800 also includes a main memory 04, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 800 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 800 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 800 using an appropriate device interface (e.g., small computer system interface (SCSI), integrated device electronics (IDE), enhanced-IDE (E-IDE), direct memory access (DMA), or ultra-DMA).

The computer system 800 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 800 may also include a display controller 809 coupled to the bus 802 to control a display 810, such as a cathode ray tube (CRT), liquid crystal display, plasma display or any display device technology now known or hereinafter developed, for displaying information to a user. The computer system 800 includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of data stored and/or generated by the computer system 800.

The computer system 800 performs a portion or all of the processing steps in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 800 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 800, for driving a device or devices for implementing the techniques presented herein, and for enabling the computer system 800 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 800 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local are network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 813, which carry the digital data to and from the computer system 800 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 800 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

In certain example implementations, the functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor or other similar machine, instructions in software, hardware, firmware, or any combination thereof, etc.). This tangible media may be non-transitory in at least one embodiment. In some of these instances, one or more memory elements (as shown in FIG. 12) can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor (as shown in FIG. 12) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

The activities, interactions, and operations in the preceding flow diagrams illustrate only some of the possible partial replication scenarios and patterns that may be executed by, or within, embodiments of a system for partially replication endpoint routing information. Some of these activities, interactions, and/or operations may be deleted or removed where appropriate, or may be modified, divided, or changed considerably without departing from the scope of the present disclosure. In addition, a number of these activities, interactions, and/or operations have been described as being executed before, after, concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

The embodiments described herein, e.g., patchwork motion field, motion vector filtering, and applying an offset vector to a motion vector, may each be used alone or in any combination. For example, the patchwork motion vector field may be used with the motion vector filtering, with the motion vector filtering and the offset vector, or with the offset vector. Likewise, the motion vector filtering may be used with the offset vector, and the offset vector may be used with the motion vector filtering.

In summary, in one form, a method is provided comprising: determining for a first block in a first frame in a sequence of frames of a video signal, a collocated block that is in a second frame of the sequence of frames, the collocated block in the second frame having an explicitly transmitted motion vector pointing to a previously decoded frame of the sequence of frames that is different from the first frame and the second frame; computing a predicted block for the first block in the first frame using the motion vector of the collocated block in the second frame; determining for a second block of the first frame, a collocated block that is in a third frame of the sequence of frames, the collocated block in the third frame having an explicitly transmitted motion vector pointing to a previously decoded frame of the sequence of frames that is different from the first frame and the third frame; and computing a predicted block for the second block of the first frame using the motion vector of the collocated block in the third frame.

In another form, an apparatus is provided comprising: a communication interface configured to enable network communications; a memory; a processor coupled to the communication interface and the memory, wherein the processor is configured to: determine for a first block in a first frame in a sequence of frames of a video signal, a collocated block that is in a second frame of the sequence of frames, the collocated block in the second frame having an explicitly transmitted motion vector pointing to a previously decoded frame of the sequence of frames that is different from the first frame and the second frame; compute a predicted block for the first block in the first frame using the motion vector of the collocated block in the second frame; determine for a second block in the first frame, a collocated block that is in a third frame of the sequence of frames, the collocated block in the third frame having an explicitly transmitted motion vector pointing to a previously decoded frame of the sequence of frames that is different from the first frame and the third frame; and compute a predicted block for the second block in the first frame using the motion vector of the collocated block in the third frame.

In still another form, one or more non-transitory computer readable storage media encoded with software comprising computer executable instructions and when the software is executed operable to perform operations comprising: determining for a first block in a first frame in a sequence of frames of a video signal, a collocated block that is in a second frame of the sequence of frames, the collocated block in the second frame having an explicitly transmitted motion vector pointing to a previously decoded frame of the sequence of frames that is different from the first frame and the second frame; computing a predicted block for the first block in the first frame using the motion vector of the collocated block in the second frame; determining for a second block in the first frame, a collocated block that is in a third frame of the sequence of frames, the collocated block in the third frame having an explicitly transmitted motion vector pointing to a previously decoded frame of the sequence of frames that is different from the first frame and the third frame; and computing a predicted block for the second block in the first frame using the motion vector of the collocated block in the third frame.

In still another form, an apparatus is provided comprising a communication interface configured to enable network communications; a memory; a processor coupled to the communication interface and the memory, wherein the processor is configured to: for a frame in a sequence of frames of a video signal, and for each of a plurality of blocks in the frame, store in the memory data describing a motion vector that is derived from collocated blocks of a plurality of previously decoded frames that are available for forming a predicted block for each of the plurality of blocks of the frame, each motion vector having an x-component and a y-component; and for a given block of the plurality of blocks, modify the motion vector of the given block by filtering the motion vector for the given block based on an x-component and a y-component of the motion vector of the given block and x-components and y-components of motion vectors for two or more neighboring blocks to the given block to produce a modified motion vector for the given block.

In yet another form, an apparatus is provided comprising a communication interface configured to enable network communications; a memory; a processor coupled to the communication interface and the memory, wherein the processor is configured to: for a given block of a first frame in a sequence of frames of a video signal, obtain a motion vector of a collocated block of a second frame in the sequence; and compute a predicted block for the given block based on the motion vector of the collocated block of the second frame and an offset vector.

In still another form, one or more non-transitory computer readable storage media encoded with software comprising computer executable instructions and when the software is executed operable to perform operations comprising: for a frame in a sequence of frames of a video signal, and for each of a plurality of blocks in the frame, storing data describing a motion vector that is derived from collocated blocks of a plurality of previously decoded frames that are available for forming a predicted block for each of the plurality of blocks of the frame, each motion vector having an x-component and a y-component; and for a given block of the plurality of blocks, modifying the motion vector of the given block by filtering the motion vector for the given block based on an x-component and a y-component of the motion vector of the given block and x-components and y-components of motion vectors for two or more neighboring blocks to the given block to produce a modified motion vector for the given block.

In yet another form, one or more non-transitory computer readable storage media encoded with software comprising computer executable instructions and when the software is executed operable to perform operations comprising: for a given block of a first frame in a sequence of frames of a video signal, obtaining a motion vector of a collocated block of a second frame in the sequence; and computing a predicted block for the given block based on the motion vector of the collocated block of the second frame and an offset vector.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method for direct mode video coding/decoding using collocated motion vectors from different reference frames that are part of a patchwork motion field comprising:
   determining for a first block in a first frame in a sequence of frames of a video signal, a collocated block that is in a second frame of the sequence of frames, the collocated block in the second frame having an explicitly transmitted motion vector pointing to a previously decoded frame of the sequence of frames that is different from the first frame and the second frame;
   computing a predicted block for the first block in the first frame using the motion vector of the collocated block in the second frame and an offset vector for at least one of forward prediction and backward prediction, wherein the offset vector is signaled at a higher level than a block level and covers multiple blocks;
   determining for a second block of the first frame, a collocated block that is in a third frame of the sequence of frames, the collocated block in the third frame having an explicitly transmitted motion vector pointing to a previously decoded frame of the sequence of frames that is different from the first frame and the third frame; and
   computing a predicted block for the second block of the first frame using the motion vector of the collocated block in the third frame and the offset vector for at least one of forward prediction and backward prediction.

2. The method of claim 1, wherein the second frame is closer temporally to the first frame than the third frame is to the first frame, and further comprising:
   determining, for the second block in the first frame, that a collocated block in the second frame does not have an explicitly transmitted motion vector.

3. The method of claim 2, wherein determining for the second block in the first frame, the collocated block in the third frame that has a motion vector, is performed when it is determined that, for the second block in the first frame, the collocated block in the second frame does not have an explicitly transmitted motion vector.

4. The method of claim 1, wherein the offset vector comprises an offset x-component and an offset y-component, and wherein computing the predicted block for the first block is based on the motion vector, the offset x-component and the offset y-component.

5. The method of claim 1, wherein computing the predicted block for the first block includes using a plurality of values for the offset vector and selecting one of the plurality of values for the offset vector that minimizes an error.

6. The method of claim 1, wherein the offset vector is signaled at a frame level or sub-frame level.

7. The method of claim 1, wherein the first frame, second frame and third frame are part of a hierarchical frame reordering scheme.

8. The method of claim 1, wherein the determining for the first block, computing the predicted block for the first block, determining for the second block, and computing the predicted block for the second block, are performed at an encoder.

9. The method of claim 1, wherein the determining for the first block, computing the predicted block for the first block, determining for the second block, and computing the predicted block for the second block, are performed at a decoder.

10. The method of claim 1, further comprising:
    for each of a plurality of blocks in the first frame, storing data describing a motion vector that is derived from collocated blocks of a plurality of previously decoded frames that are available for forming a predicted block for each of the plurality of blocks of the first frame, each motion vector having an x-component and a y-component; and
    for a given block of the plurality of blocks, modifying the motion vector of the given block by filtering the motion vector for the given block based on an x-component and a y-component of the motion vector of the given block and x-components and y-components of motion vectors for two or more neighboring blocks to the given block to produce a modified motion vector for the given block.

11. The method of claim 1, wherein:
    computing the predicted block for the first block in the first frame is performed based on the motion vector of the collocated block in the second frame and a first offset vector for forward prediction and a second offset vector for backward prediction; and
    computing the predicted block for the second block in the first frame is performed based on the motion vector of the collocated block in the third frame and the first offset vector for forward prediction and the second offset vector for backward prediction.

12. An apparatus for direct mode video coding/decoding using collocated motion vectors from different reference frames that are part of a patchwork motion field, the apparatus comprising:
    a communication interface configured to enable network communications;
    a memory;
    a processor coupled to the communication interface and the memory, wherein the processor is configured to:

determine for a first block in a first frame in a sequence of frames of a video signal, a collocated block that is in a second frame of the sequence of frames, the collocated block in the second frame having an explicitly transmitted motion vector pointing to a previously decoded frame of the sequence of frames that is different from the first frame and the second frame;

compute a predicted block for the first block in the first frame using the motion vector of the collocated block in the second frame and an offset vector for at least one of forward prediction and backward prediction, wherein the offset vector is signaled at a higher level than a block level and covers multiple blocks;

determine for a second block of the first frame, a collocated block that is in a third frame of the sequence of frames, the collocated block in the third frame having an explicitly transmitted motion vector pointing to a previously decoded frame of the sequence of frames that is different from the first frame and the third frame; and compute a predicted block for the second block of the first frame using the motion vector of the collocated block in the third frame and the offset vector for at least one of forward prediction and backward prediction.

13. The apparatus of claim 12, wherein the offset vector comprises an offset x-component and an offset y-component, and wherein the processor is configured to compute the predicted block for the first block based on the motion vector, the offset x-component and the offset y-component.

14. The apparatus of claim 12, wherein the processor is configured to compute the predicted block for the first block using a plurality of values for the offset vector and select one of the plurality of values for the offset vector that minimizes an error.

15. The apparatus of claim 12, wherein the offset vector is signaled at a frame level or sub-frame level.

16. The apparatus of claim 12, wherein the processor is configured to:
compute the predicted block for the first block in the first frame based on the motion vector of the collocated block in the second frame and a first offset vector for forward prediction and a second offset vector for backward prediction; and
compute the predicted block for the second block in the first frame based on the motion vector of the collocated block in the third frame and the first offset vector for forward prediction and the second offset vector for backward prediction.

17. One or more non-transitory computer readable storage media encoded with software comprising computer executable instructions and when the software is executed operable to perform operations comprising:
determining for a first block in a first frame in a sequence of frames of a video signal, a collocated block that is in a second frame of the sequence of frames, the collocated block in the second frame having an explicitly transmitted motion vector pointing to a previously decoded frame of the sequence of frames that is different from the first frame and the second frame;

computing a predicted block for the first block in the first frame using the motion vector of the collocated block in the second frame and an offset vector for at least one of forward prediction and backward prediction, wherein the offset vector is signaled at a higher level than a block level and covers multiple blocks;

determining for a second block of the first frame, a collocated block that is in a third frame of the sequence of frames, the collocated block in the third frame having an explicitly transmitted motion vector pointing to a previously decoded frame of the sequence of frames that is different from the first frame and the third frame; and computing a predicted block for the second block of the first frame using the motion vector of the collocated block in the third frame and the offset vector for at least one of forward prediction and backward prediction.

18. The non-transitory computer readable storage media of claim 17, wherein the second frame is closer temporally to the first frame than the third frame is to the first frame, further comprising instructions operable for:
determining, for the second block in the first frame, that a collocated block in the second frame does not have an explicitly transmitted motion vector.

19. The non-transitory computer readable storage media of claim 18, further comprising instructions operable for determining for the second block in the first frame the collocated block in the third frame that has a motion vector, when it is determined that, for the second block in the first frame, the collocated block in the second frame does not have an explicitly transmitted motion vector.

20. The non-transitory computer readable storage media of claim 17, wherein the instructions are further operable for:
computing the predicted block for the first block in the first frame based on the motion vector of the collocated block in the second frame and a first offset vector for forward prediction and a second offset vector for backward prediction; and
computing the predicted block for the second block in the first frame based on the motion vector of the collocated block in the third frame and the first offset vector for forward prediction and the second offset vector for backward prediction.

21. The non-transitory computer readable storage media of claim 17, wherein the offset vector comprises an offset x-component and an offset y-component, and wherein the instructions operable for computing the predicted block of the first block are based on the motion vector, the offset x-component and the offset y-component.

22. The non-transitory computer readable storage media of claim 17, wherein the instructions operable for computing the predicted block for the first block include using a plurality of values for the offset vector and selecting one of the plurality of values for the offset vector that minimizes an error.

23. The non-transitory computer readable storage media of claim 17, wherein the offset vector is signaled at a frame level or sub-frame level.

* * * * *